Figure 1:
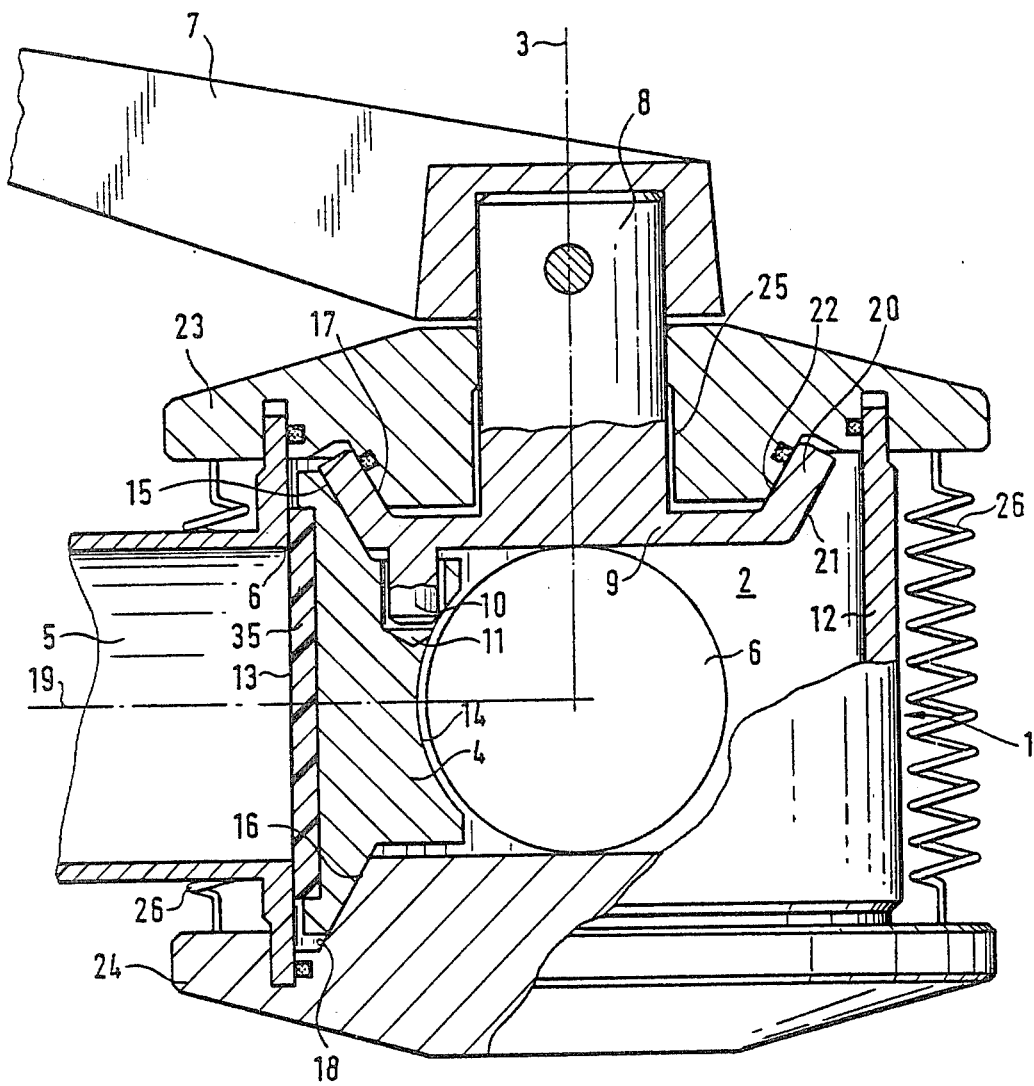

United States Patent [19]

Wulf

[11] 4,212,448

[45] Jul. 15, 1980

[54] SHUT-OFF VALVE

[75] Inventor: Günther Wulf, Wangen, Fed. Rep. of Germany

[73] Assignee: Hermann Waldner KG, Wangen, Fed. Rep. of Germany

[21] Appl. No.: 943,381

[22] Filed: Sep. 18, 1978

Related U.S. Application Data

[63] Continuation of Ser. No. 764,231, Jan. 31, 1977, abandoned.

[30] Foreign Application Priority Data

Apr. 26, 1976 [DE] Fed. Rep. of Germany ....... 2618115

[51] Int. Cl.² ............................................ F16K 25/00
[52] U.S. Cl. ................................ 251/184; 137/246.22; 251/163
[58] Field of Search ............... 251/161, 162, 163, 181, 251/182, 183, 184

[56] References Cited

U.S. PATENT DOCUMENTS 2,931,380  4/1960  Mueller .......................... 251/184 X

FOREIGN PATENT DOCUMENTS 1710206  7/1954  Fed. Rep. of Germany.

*Primary Examiner*—Harold W. Weakley
*Attorney, Agent, or Firm*—Stevens, Davis, Miller & Mosher

[57] ABSTRACT

A shut-off valve adapted to be used to advantage in pipework installations carrying liquid, semi-liquid or pasty material has a housing having a bore therein and ports in the wall for the connection of conduits. A member for selectively closing the ports is rotatably disposed in the bore of the housing. The housing has annular wedge shaped surfaces on opposite sides of the bore and the closure member has tapered conical surfaces which are disposed against the wedge shaped surfaces of the housing.

3 Claims, 2 Drawing Figures

SHUT-OFF VALVE

This is a continuation of application Ser. No. 764,231 filed Jan. 31, 1977, now abandoned.

The invention relates to a shut-off valve for fluids, especially for use in pipework installations carrying liquid or semi-liquid or pasty food products, comprising a housing having a bore with at least one port in its wall and a closure member rotatable in the bore to uncover and seal off the port and to be urged against the wall by the cooperation of wedge surfaces.

Such valves are known. They have a number of radial pipe connections spaced apart, generally at 90°, of which one serves as an inlet, for example, for milk, another serves as an inlet for the supply of a flushing liquid and a third serves as an outlet, for example, for the milk and for the flushing liquid. The closure member is turned at will to the position closing off the port of the pipe connection for the supply of milk when the valve is to be flushed out or is turned to the position closing the port for the flushing liquid when milk is to be supplied.

The closure member is mounted on a central spindle on the axis of the bore of the housing, this spindle passing right through the bore. One end of the spindle projects from the housing of the valve and is provided with a handle for turning the spindle, and thereby the closure member, about the axis. Moreover, the spindle is made hollow and that end which carries the handle is provided with a screw engagement. Between the screw engagement and the closure member and within the hollow spindle there is a wedge bar with an inclined wedge surface at the end adjacent the closure member. This wedge surface cooperates with a complementary wedge surface on the adjacent end of the closure member which is radially displaceable with respect to the spindle, so that when the closure member is in front of one of the ports it can be urged radially against the wall of the bore in the housing by actuation of the screw engagement to move the wedge bar (German Patent Specification No. 1 236 287).

Also it is possible to make the end of the closure member that is adjacent to the wedge bar in two parts and to provide a compression spring between the part having the wedge surface and the actual closure member itself (German Pat. No. 1 241 213). Furthermore, there is known a modified construction of this class in which the closure member is normally urged radially outwards against the wall of the bore of the housing by a compression spring and the wedge bar and screw engagement serve to apply a load to the closure member opposing the action of this spring, to relieve the member of the spring loading, to allow the closure member to be turned within the bore of the housing (German Pat. No. 1 241 214).

A serious drawback in these known valves has been found to be the fact that the cross-section for flow is obstructed to a considerable extent and within the valve there are several sharp corners and edges which interfere with flow, and it is only with difficulty that one can meet the requirement, which applies to equipment for the food industry, including shut-off valves for supplying food materials, that they should be easy to flush out thoroughly. Another drawback is the relatively large number of sealing points and the fact that the number of individual components to be cleaned is substantial.

It is an object of the invention to provide a valve of the kind stated in the introductory paragraph above which is distinguished by simple construction from a small number of components and with a minimum of sealing points and having as large as possible a cross-section for flow and which is practically entirely free and uninterrupted even when two diametrically opposite closure members are provided, so that not only is effective flushing achieved for cleaning it out but also semi-liquid and pasty media can pass through without difficulty by virtue of the large smooth and uninterrupted internal cross-section. Also security against leakage should be made possible, this being necessary in automatic shut-off valves in order to prevent the flushing liquid coming into contact with the medium that is flowing through it, for example, milk.

The objects of the invention are accomplished by providing a valve having a housing having a bore with at least one port in its wall and a rotatable closure member for the port which is provided at opposite sides of the port with respective conical wedge surfaces co-axial with the axis of rotation of the member and diverging away from the opening, each of these surfaces cooperating with a complementary conical wedge surface associated with the housing, the latter two surfaces being urged towards one another.

Figure 2:
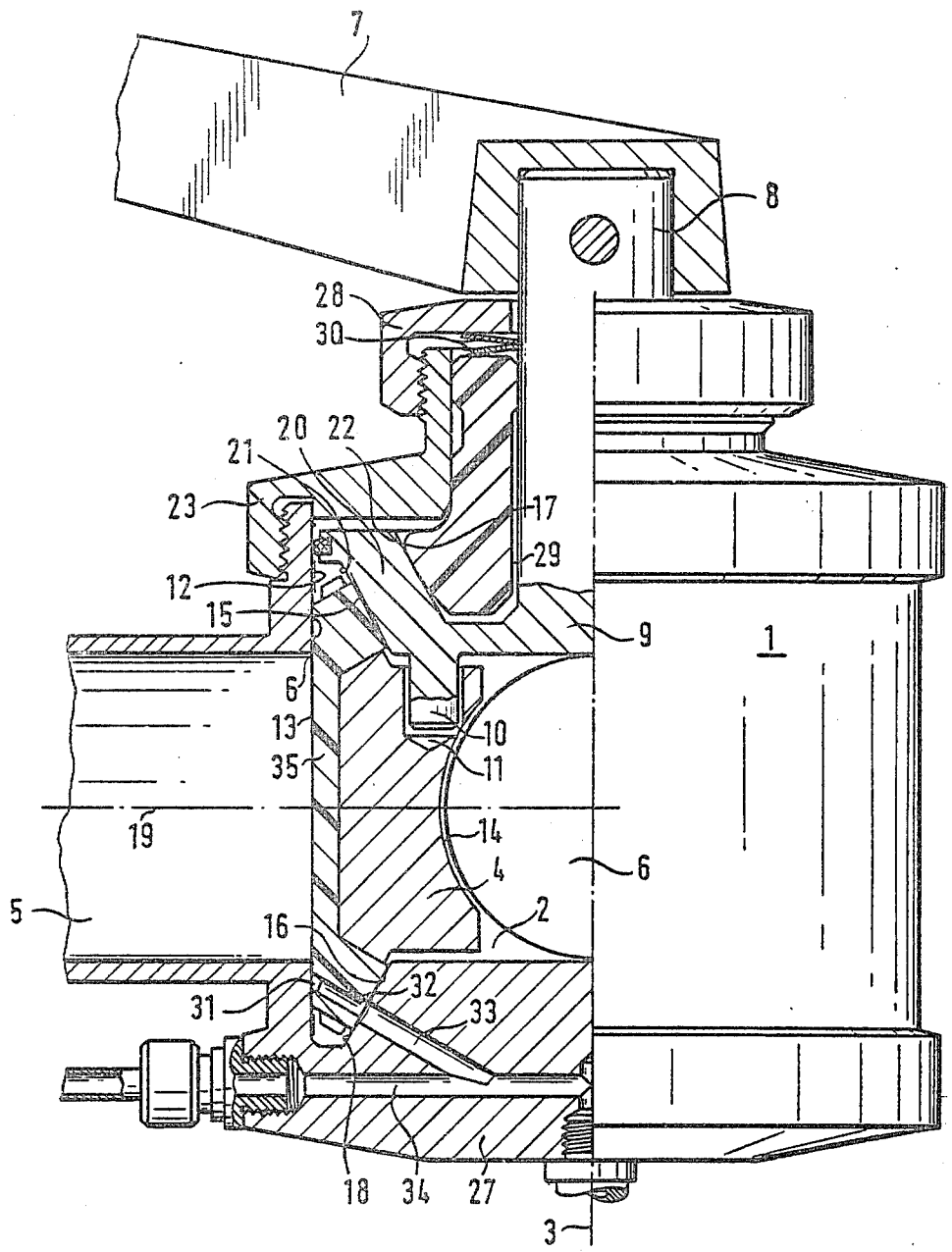

Two examples of valves according to the invention are described in the following in conjunction with the drawings in which:

FIG. 1 shows diagrammatically a longitudinal section through a first embodiment of the invention; and FIG. 2 shows diagrammatically a longitudinal section corresponding to FIG. 1 but showing a second embodiment.

The shut-off valves shown in FIGS. 1 and 2, suitable in particular for pipework installations carrying liquid or semi-liquid food materials, each comprises a housing 1 with a cylindrical bore 2 and a closure member 4 which is rotatable within the bore 2 about the longitudinal axis 3 of the bore. Provided on the housing 1 are three radial pipe connections 5, spaced apart by 90° each having a port 6 leading into the bore 2. These ports 6, of which only two are visible in FIGS. 1 and 2 as the third port lies diametrically opposite the central port 6 in FIGS. 1 and 2, are each capable of being sealed off by the closure member 4, which is shown sealing off the left hand port.

To move the closure member 4 there is a handle 7 which is secured to the adjacent end, projecting from the housing 1, of an actuating spindle 8. The spindle 8 is provided on a cup-shaped actuator 9 which is mounted at that end of the bore 2 in the housing 1 which is nearer the handle 7, and has on that side which faces away from the spindle 8 a peg 10 engaging in a recess 11 in the closure member 4. On movement of the handle 7 the actuator 9 turns about the axis of the bore 2 so that the closure member 4 is displaced by the peg 10 along the cylindrical wall 12 of the bore. Another form of actuating member could be provided instead of the handle 7, for example, a hydraulic or pneumatic actuating cylinder, where the valve is to be actuated automatically and/or by remote control.

The closure member 4 has a cross-section perpendicular to the axis 3 of the bore 2 which is of segmental shape. While the external surface 13 of the closure member 4 has a cylindrical shape which is substantially co-axial with the axis 3, its rear face has a recess 14 with a cylindrical surface of which the radius of curvature corresponds substantially to the radius of the ports 6 and of which the axis is at right angles to that of the cylindrical external surface 13, as shown in FIGS. 1 and 2 so that, when one of the ports 6 is sealed off by the closure member 4, the other two ports 6 are completely uncovered over their entire cross-sections.

On the rear face of the closure member 4, above and below the ports 6, there are respective conical tapered surfaces 15 and 16, co-axial with the axis 3 of the bore 2 and diverging away from the ports, these surfaces cooperating with respective complementary conical wedge surfaces 17 and 18 on the housing 1. The two surfaces 17 and 18 on the housing 1 are urged towards one another. The two surfaces 15 and 16 on the closure member 4 are symmetrical with respect to one another and with respect to the central plane 19 of the closure member 4 which is perpendicular to the axis 3 of the bore 2. The force with which the two surfaces 17 and 18 are urged together is adjustable.

In this way there is achieved a well-defined and permanently maintained engagement of the closure member 4 radially outwards against the wall 12 of the bore 2, this being achieved reliably and without complication.

In both the embodiments illustrated the upper surface 15 on the closure member 4 does not engage directly against the corresponding wedge surface 17 on the housing 1 but, on the contrary, there is interposed between these two surfaces an inclined flange 20 of the actuator 9 which has a corresponding conical outer surface 21 and inner surface 22.

In the embodiment shown in FIG. 1 the housing 1 has a top cover 23 and a bottom cover 24. The two wedge surfaces 17 and 18 associated with the housing 1 are formed respectively on the top cover 23 and bottom cover 24. Whereas the bottom cover 24 is closed, the top cover 23 has a hole 25 through which the spindle 8 projects. The two covers 23 and 24 are relatively movable in the direction of the longitudinal axis 3 of the bore 2 in the housing 1 and are urged together by tension springs, clamps, securing screws or pneumatic or hydraulic cylinders 26, so that this mutual loading is accurately adjustable.

In the embodiment shown in FIG. 2, the housing 1 is of pot-like shape, that is to say, it is provided with a fixed bottom wall 27 in place of the bottom cover 24. The top cover 23 is permanently screwed onto the housing 1. It has a screw cap on that end of it which is furthest from the housing 1. The upper wedge surface 17 is provided on an abutment member in the form of a sleeve 29 which is movable in the direction of the axis 3 and the surface is convexly curved in cross-section, as clearly shown in FIG. 2.

The sleeve 29 also forms a bearing bush for the spindle 8 and is mounted to be capable of sliding axially in the cover 23. Between the cap 28 and the adjacent end of the sleeve 29 there is a compression spring 30 in the form of plate springs or Belleville washers. The preloading of the springs is adjustable by screwing the cap 28 with respect to the cover 23, and this adjusts the loading of the closure member 4 against the wall 12.

To safeguard against leakage, in the embodiment shown in FIG. 2 an annular groove 31 is provided between the housing 1 and the closure member 4, when the latter faces one of the ports 6, this groove communicating with lower leakage drain passages in the housing 1. In the case illustrated, the groove 31 is provided on the closure member 4 itself, in that region of it which, when the member 4 faces the port, engages against the wall 12. A passage 32 is provided in the closure member 4, communicating on the one hand with the groove 31 and on the other hand, in the angular position of the member 4 illustrated, with a passage 33 in the bottom wall 27 of the housing 1, leading to a passage 34 in this wall. Via the groove 31, any leaking fluid, for example, flushing liquid, emerging from the left hand pipe connection 5 in FIG. 2 as a result of any imperfection in the sealed engagement of the member 4 against the wall 12, is allowed to flow away so that it does not reach the bore 2 but, on the contrary, flows away via the passages 32, 33 and 34, if necessary, to a leakage-detecting or indicating device.

Preferably, the closure member 4 is made of synthetic resin, in particular, polytetrafluoroethylene or a tetrafluoroethylene/hexafluoropropylene copolymer, at least on that face which is towards the wall 12. For this purpose an insert or added portion 35 of such a material can be provided in or on the said face of the member 4, as shown in FIGS. 1 and 2. In the embodiment of FIG. 2, the groove 31 is formed in this insert 35, likewise the associated passage 32 and the two wedge surfaces 15 and 16. A polytetrafluoroethylene or a tetrafluoroethylene/hexafluoropropylene copolymer provides outstanding sliding characteristics for the member 4 with respect to a housing 1 made of steel, and furthermore provides a certain degree of useful elasticity. Moreover, the required resistance is also provided to attack by liquid food materials such as milk, and to the normal flushing liquids.

While the embodiment shown in FIG. 1 is suitable primarily for large valves, that in FIG. 2 is particularly suited to smaller kinds of valves.

Departures from the forms illustrated by way of example are possible. For example, two or more closure members 4, in particular two diametrically opposed members 4 and several pipe connections 5 could be provided, in particular four such connections 5 and associated ports 6, spaced apart around the housing 1 at 90° intervals.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A shut-off valve comprising:
   a housing having a substantially vertically extending cylindrical bore therein;
   at least two pipe connections radially opening into the housing;
   a rotatable actuator comprising an actuating spindle substantially coaxial with the bore and an actuating part extending radially outwardly from the spindle and comprising an upper downwardly and radially outwardly facing wedge surface;
   means in the bore defining a first lower upwardly and radially outwardly facing wedge surface;
   a closure member supported within the bore, said closure member defining opposite upper and lower wedge surfaces coaxial with the longitudinal axis of the housing, said lower wedge surface of the closure member being in facing abutment with the first lower wedge surface and said upper wedge surface of the closure member being in facing abutment with the wedge surface of the actuator;

a upper cover on the upper end of the housing through which the actuating spindle extends;

a tubular bearing bush in direct contact with and between the actuating spindle and the cover;

means in contact with the upper end of the bush for biasing it against the actuating part and it against the closure member;

a cap, fixedly secured to and extending over the upper end of said cover, through which the actuating spindle extends; and said biasing means comprises a biasing member in direct contact with and between the cap and the upper end of the bush.

2. A shut-off valve as claimed in claim 1 wherein:

said cap is screwed to said cover; and the force of said biasing member is adjustable in accordance with the extent to which the cap is screwed onto the cover.

3. A shut-off valve as claimed in claim 2 wherein:

said biasing member comprises a plate spring sandwiched between the cap and the upper end of the bush.

* * * * *